United States Patent [19]

Awazu et al.

[11] 4,350,604

[45] Sep. 21, 1982

[54] PHOSPHOR

[75] Inventors: Kenzo Awazu; Kazu Matsunaga, both of Amagasaki, Japan

[73] Assignee: Mitsubishi Denki Kabushiki Kaisha, Tokyo, Japan

[21] Appl. No.: 297,278

[22] Filed: Aug. 28, 1981

[30] Foreign Application Priority Data

Apr. 15, 1981 [JP] Japan .................................. 56-56775

[51] Int. Cl.³ .............................................. C09K 11/30
[52] U.S. Cl. .............................................. 252/301.4 R
[58] Field of Search ................................. 252/301.4 R

[56] References Cited

U.S. PATENT DOCUMENTS 3,723,339 3/1973 Wanmaker et al. ...... 252/301.4 R X
3,857,054 12/1974 Lehmann ................. 252/301.4 R X

FOREIGN PATENT DOCUMENTS 51-42436 3/1976 Japan .

OTHER PUBLICATIONS

Palumbo, Journal of Luminescence, 4, 89–97 (1971).

Primary Examiner—Jack Cooper
Attorney, Agent, or Firm—Oblon, Fisher, Spivak, McClelland & Maier

[57] ABSTRACT

A phosphor having a matrix formulation of $Li(Al,Ga)O_2$ having an atomic ratio of Al to Ga ranging from 75:25 to 5:95, wherein 0.3 to 1.3 atomic percent of $Fe^{3+}$ ions are additionally incorporated in the matrix as an active component and Li is present in substantially a 1:1 stoichiometric ratio to the total of Al, Ga and Fe. The phosphor so produced is superior to previously disclosed phosphors when used in an optical code reader to read codes from colored paper.

3 Claims, 2 Drawing Figures

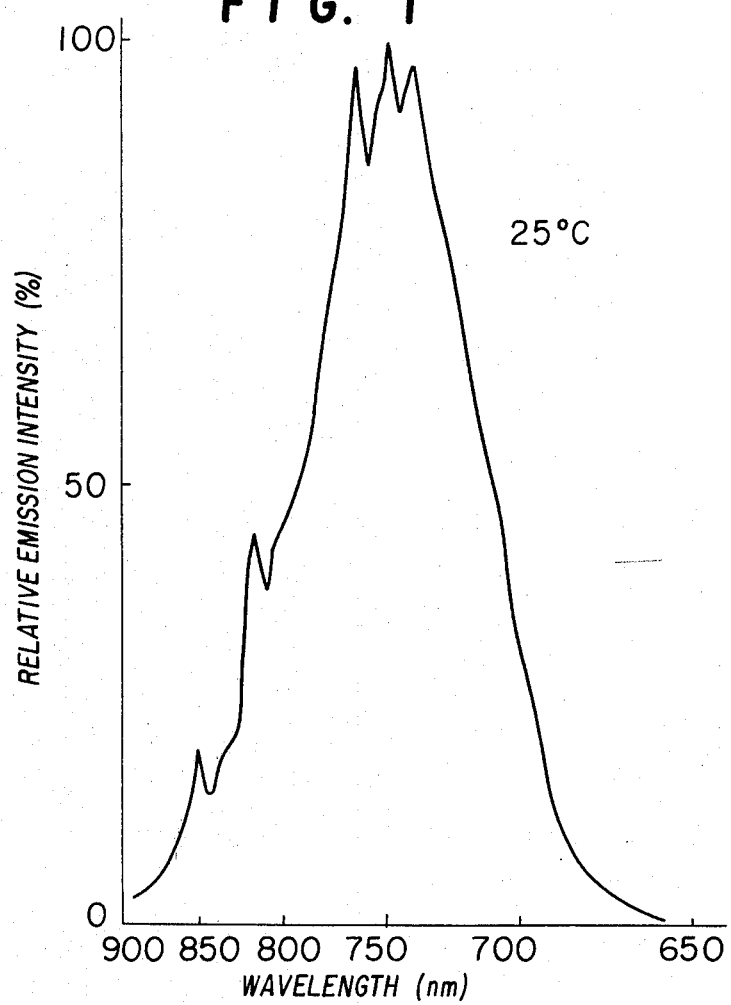
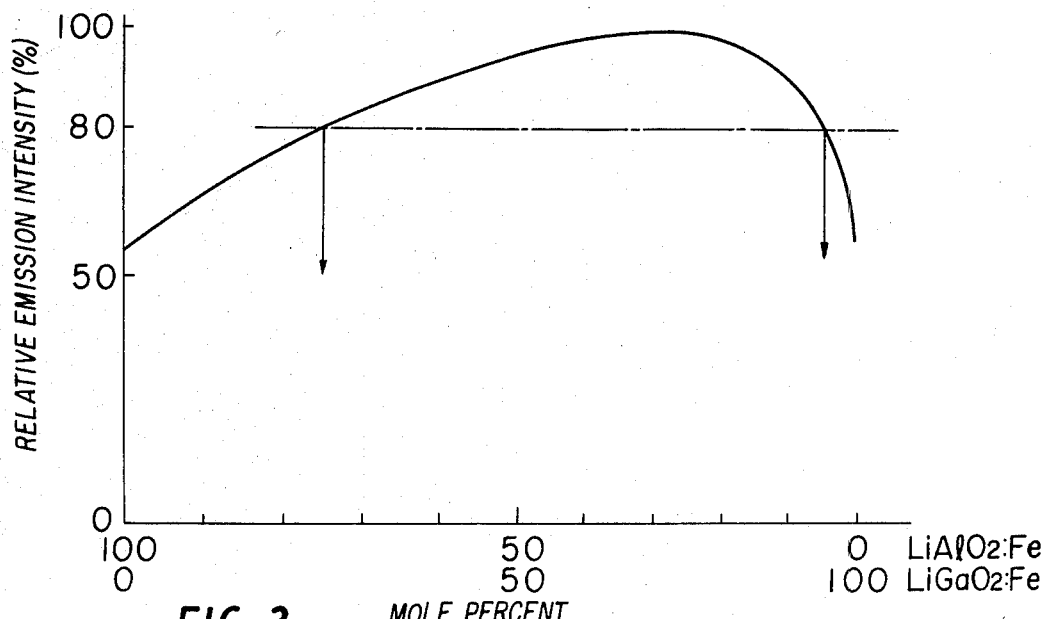

PHOSPHOR

BACKGROUND OF THE INVENTION

1. Field of the Invention

The present invention relates to a phosphor which is excited by light with a wavelength of 254 nm, for example, in a mercury discharge tube, to emit near infrared rays having maximum intensity at about 750 nm.

2. Description of the Prior Art

Many different office machines have been developed and utilized in various fields as a result of the remarkable recent developments in electronic technology. One such office machine is an optical code reader (referred to as OCR). In some previously used OCRs an incandescent lamp or a halogen lamp has been used as the light source for reading the code. However, the efficiency of such light sources is low, whereby power consumption has been disadvantageously large and heat output disadvantageously high. Therefore, fluorescent lamps which emit dark red light have come into use.

The phosphors currently used for such fluorescent lamps have several disadvantages in view of the efficiency and emission output maintenance factor of the lamp. When a sheet having many printed colors is read out by an OCR having a fluorescent lamp in which a previously disclosed phosphor is used, the OCR reads out not only written codes, but also the printed frame and symbols. Accordingly, only sheets having limited color could be used.

SUMMARY OF THE INVENTION

It is an object of the present invention to provide a phosphor which imparts high luminous efficiency to a discharge tube and which has an excellent emission output maintenance factor.

The foregoing and other objects of the present invention have been attained by providing a phosphor having a matrix formulation of $Li(Al,Ga)O_2$ having an atomic ratio of Al to Ga ranging from 75:25: to 5:95, wherein 0.3 to 1.3 atomic percent of $Fe^{3+}$ ions are additionally present in said matrix as an active component and Li is present in substantially a 1:1 stoichiometric ratio to the total of Al, Ga, and Fe.

BRIEF DESCRIPTION OF THE DRAWINGS

Various other objects, features and attendant advantages of the present invention will be more fully appreciated as the same becomes better understood from the following detailed description when considered in connection with the accompanying drawings wherein:

FIG. 1 is an emission spectrum of a phosphor of the present invention; and

FIG. 2 shows variation of emission output depending upon the ratio of components of the matrix of a phosphor of the present invention.

DETAILED DESCRIPTION OF THE PREFERRED EMBODIMENTS

As a phosphor having a near infrared emission spectrum, a phosphor of $LiAlO_2$ activated with $Fe^{3+}$, or $LiGaO_2$ activated with $Fe^{3+}$, has been known. It has been known that $Fe^{3+}$ ions in a symmetrical cubic lattice have a $3(d)^5$ electron configuration and that $Fe^{3+}$ in tetrahedral coordination results in emission ranging from deep red to near infrared.

The inventors have prepared solid solutions of $LiAlO_2$ and $LiGaO_2$ having the same crystalline structure and have activated them with $Fe^{3+}$ to to obtain a series of formulations of phosphors. The emissions of the phosphors under excitation at 254 nm have been measured. The emission outputs of the embodiments containing the combination of components are higher than the outputs of either of the single compounds and thus results in an unexpected improvement over the prior art phosphors.

When Ga is introduced into the formulation of $LiAlO_2$: Fe, no substantial shift of the emission spectrum has been found. However, this has been found to result in higher emission at near 800 nm on the long wavelength side whereas to result in lower emission at about 720 nm on the short wavelength side. The present invention has been completed by the findings.

The emission spectra of the phosphors were measured using a spectrograph having a silicon photocell with a red filter.

The phosphor of the present invention has a matrix formulation of $Li(Al,Ga)O_2$ having an atomic ratio of Al to Ga of from 75:25 to 5:95 and incorporates 0.3 to 1.3 mole percent of $Fe^{3+}$ ions as an activator. It has a substantially 1:1 stoichiometric ratio of Li to the total of Al, Ga and Fe.

In the present invention, the atomic percent of Al to Ga is limited to from 75:25 to 5:95 by practical considerations. In general, those fluorescent lamps having an efficiency of at least 80% of the maximum output are considered practical. The formulations of the phosphors have been studied to find that this efficiency is imparted by an atomic ratio of Al to Ga ranging from 75:25: to 5:95 in $Li(Al,Ga)O_2$ as shown in FIG. 2.

The phosphor of the present invention can be obtained by weighing and mixing powdery materials and firing the mixture. The firing temperature is preferably in the range of 1300° to 1350° C. This firing temperature is lower than Melting point for the individual Al component or Ga component, which is about 1900° to 2000° C. In view of the formulation of the phosphor of the present invention, it is to be expected that the melting point of the three component composition is lower than that of the two component composition. When the composition is heated to higher than 1360° C., the rate of decomposition of $Fe_2O_3$ into FeO is increased whereby the emission from $Fe^{3+}$ decreases rapidly because of the decrease in available $Fe^{3+}$ emission centers. When the firing temperature is lower than 1300° C., the solid phase reaction velocity is disadvantageously slow, thereby limiting crystalline growth. In fact, in the case of a single compound of $LiAlO_2$ or $LiGaO_2$, the particle diameter of the resulting phosphor is remarkably small. When the particle diameter of the phosphor is small, the scattering reflection of the exciting light is large whereby the light absorption is low. Moreover, $Fe^{3+}$ ions on the particle surfaces and near the interfaces of particles can not act as emission centers because of the deleterious effect of the surface energy. In such cases of small particle size, therefore, the emission efficiency may be low.

In accordance with the present invention, the phosphor has a relatively low melting point as described above, and the desired crystalline growth can be expected. In fact, the efficiency of the resulting phosphor is high. When the phosphor is used in a fluorescent lamp, it gives an emission spectrum having a relatively narrow width and a peak of wavelengths near 750 nm as shown in FIG. 1.

The present invention will be further illustrated by certain examples and references which are provided for purposes of illustration only and are not intended to limit the present invention.

EXAMPLE 1

The following powdery materials were prepared:
LiCO$_3$ (as Li): 100.4 atomic percent
Al$_2$O$_3$ (as Al): 75.0 atomic percent
Ga$_2$O$_3$ (as Ga): 25.0 atomic percent
Fe$_2$O$_3$ (as Fe): 0.4 atomic percent The powdery materials were charged into a ball pot mill, and a suitable amount of ethanol was added to the powdery materials to grind them by ball milling for 2 hours. The mixture was charged into an evaporating dish and dried. The dried mixture was charged into an alumina crucible and was fired at 1350° C. for 2 hours in an electric furnace to obtain a phosphor.

EXAMPLE 2

The following powdery materials were prepared:
LiCO$_3$ (as Li): 100.6 atomic percent
Al$_2$O$_3$ (as Al): 40.0 atomic percent
Ga$_2$O$_3$ (as Ga): 60.0 atomic percent
Fe(NO)$_3$ (as Fe): 0.6 atomic percent The powdery materials were admixed with a suitable amount of water, the mixture was ground by ball milling for 2 hours, dried, and fired at 1330° C. for 2 hours in an electric furnace to obtain a phosphor.

EXAMPLE 3

The following powdery materials were prepared:
LiCO$_3$ (as Li): 101.3 atomic percent
Al$_2$O$_3$ (as Al): 5.0 atomic percent
Ga$_2$O$_3$ (as Ga): 95.0 atomic percent
FeCl$_3$ (as Fe): 1.3 atomic percent The powdery materials were mixed, dried, and then fired at 1300° C. for 3 hours to obtain a phosphor.

The powdery materials used as the raw materials each had a purity of 99.9%. Even though raw materials having higher purities were used in other preparations, the characteristics were not substantially improved. In all examples, each product was allowed to cool spontaneously to about room temperature after the firing and was taken out of the electric furnace so as to prevent the Fe$^{2+}$ ions resulting from the firing process from solidifying into the crystal and causing quenching.

The Fe component content is preferably about 0.6 atomic percent when the atomic percent of the matrix formulation with respect to Li(Al,Ga)O$_2$ is considered to be 100.0. If the Fe content is in the range of 0.3 to 1.3 atomic percent, the luminous efficiency is sufficient and is substantially the same over this range.

In all of the examples, the environment in the firing step was air. The firing time need not be precise and can be selected as needed depending upon the quantity of the fired product being produced.

20 W standard fluorescent lamps were prepared using the resulting powdery phosphor obtained by each of the examples. Each luminous output was then measured, and the results are shown in the following Table.

As references, two fluorescent lamps were prepared by using each conventional phosphor of LiAlO$_2$: Fe or LiGaO$_2$: Fe, and the luminous output of each of these was also measured.

TABLE

| Phosphor used for fluorescent lamp | Relative infrared output (%) | Average particle diameter measured by fluid permeating method ($\mu$) |
|---|---|---|
| LiAlO$_2$:Fe | 56 | 1.4 |
| LiGaO$_2$:Fe | 62 | 2.0 |
| Phosphor of Exp. 1 | 78 | 2.7 |
| Phosphor of Exp. 2 | 98 | 3.4 |
| Phosphor of Exp. 3 | 79 | 4.1 |

The near infrared emission lamps prepared according to the examples were then installed in an OCR to read out codes written on 17 kinds of colored sheets, which were printed with colors ranging from blue to red.

When the conventional dark red fluorescent lamp was used, the codes could be read on only 7 kinds of sheets among 17 kinds of sheets used, whereas when the fluorescent lamps of the present invention were used, the codes on 16 kinds of sheets were read out. This is a remarkably superior result, and contributes highly to improving the characteristics of OCRs.

The phosphors of the present invention impart the same luminous phenomenon when irradiated by an electron beam. Therefore, they can be used for cathode ray tubes, and thus also be utilized in a terminal display of a computer.

As described, the phosphor of the present invention has both excellent luminous efficiency and an excellent light emission output maintenance factor. It emits in the near infrared region having an emission peak at 740 nm. When used in an OCR, improved operating conditions are obtained. For example, the number of drop-out codes which could not be read from colored sheets is remarkably decreased by using the phosphor for fluorescent lamps used for OCRs in comparison with the conventional phosphors. Thus, applications of OCR are expected to enlarge remarkably, and the industrial advantages of the invented phosphor are remarkably high.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A phosphor having a matrix formulation of Li(Al,Ga)O$_2$ having an atomic ratio of Al to Ga ranging from 75:25 to 5:95, wherein 0.3 to 1.3 atomic percent of Fe$^{3+}$ ions are incorporated in said matrix as an activator and Li is present in substantially a 1:1 stoichiometric ratio to the total of Al, Ga and Fe.

2. The phosphor according to claim 1, which is obtained by firing a mixture of LiCO$_3$, Al$_2$O$_3$, Ga$_2$O$_3$ and a Fe component at 1300° to 1350° C. in air.

3. The phosphor according to claim 2, wherein said Fe component is FeCl$_3$, Fe(NO$_3$)$_3$, or Fe$_2$O$_3$, or a mixture thereof.

* * * * *